United States Patent [19]

Tice

[11] Patent Number: 5,137,257
[45] Date of Patent: Aug. 11, 1992

[54] FEEDBACK MOTOR-OPERATED VALVE

[75] Inventor: Bill Tice, Carlsbad, Calif.

[73] Assignee: ETI Systems, Oceanside, Calif.

[21] Appl. No.: 716,519

[22] Filed: Jun. 17, 1991

[51] Int. Cl.⁵ ............................................. F16K 31/04
[52] U.S. Cl. ............................ 251/129.11; 251/129.12; 251/129.04; 74/411; 74/424.8 VA; 185/40 R
[58] Field of Search ........................ 251/129.11, 129.12, 251/129.04; 74/411, 424.8 VA; 185/40 R

[56] References Cited

U.S. PATENT DOCUMENTS 4,203,573   5/1980   Boss .............................. 251/129.12
4,621,789  11/1986   Fukamachi ................ 251/129.11 X Primary Examiner—Arnold Rosenthal
Attorney, Agent, or Firm—John J. Murphey

[57] ABSTRACT

A feedback, motor-operated valve, including a valve casing having an inlet, an outlet and a valve seat operably positioned therebetween, and further including a valve element movably mounted in the casing to control flow between the inlet and the outlet, the valve element adapted for screw-like movement into and out of sealing engagement with the valve seat by a valve stem rotatably mounted in the valve casing and extending through the casing exterior thereof, a reversible motor for actuating the valve including a reversible drive motor having an output shaft and drive gear which can be driven together in both a clockwise and counterclockwise direction for turning the valve element, a driven shaft interposed the motor drive shaft and the valve stem and connected to the valve stem, including a driven gear for engagement with the drive gear to effect turning of the valve element from turning the motor drive shaft, an electro-mechanical feedback operably connected to the driven shaft for providing an electric signal output in response to the position of the valve element with respect to the valve seat, and a device to provide a controlled amount of overturning of the motor drive shaft following full closure of the valve element against the valve seat and simultaneously storing a portion of the drive energy expended in the overturning, to bias the valve in its closed position, and to discharge the stored energy to aid in opening the valve upon reverse turning of the drive motor and motor drive shaft.

25 Claims, 2 Drawing Sheets

FEEDBACK MOTOR-OPERATED VALVE

BACKGROUND OF THE INVENTION

1. Field of the Invention

This invention pertains to the field of flow control devices. More particularly, it relates to motor-driven control valves and to a means of insuring continuous closure of a closed valve and means to apply added energy to the valve when it is first opened.

2. Description of the Prior Art

Many processes involve the flow of liquids and gases in tubes and pipes and require that such flows be regulated in some controlled manner. Needle valves, regulating valves and shut-off valves are examples of devices used to control the flow of these materials. Where many valves are involved or are remotely located, it has become popular to connect motors to the valves to drive them between full-open, closed and to various desired positions therebetween. Most of the motors are electric and the means of controlling them vary from simple on-off switches to feedback mechanisms coupled to computer circuitry.

An electric drive motor, usually of the reversible type, is connected to the valve stem that protrudes from the valve body. Control means are attached to the motor to drive it and the valve stem in one direction or another. Certain problems have developed in this field have not been solved so that the full utilization of motor control has not yet occurred.

For instance, one problem concerns the application of motor control to valve closure. Through repeated opening and closing of a valve, the valve seat wears, thus making the valve element that closes against the valve seat travel further into the valve housing. Since virtually all valve elements advance toward and away from the valve seat through screw threads, the wearing of the valve seat requires the valve element and stem extending therefrom to close against the valve seat at different angular positions. This means that the valve cannot be predicted to close at any particular angular position of the stem because the slightest wear on the seat will prevent the angular position from insuring that the valve is closed and allow leakage through the valve.

Accordingly, valves are set to be closed by ordering the drive motor to turn the valve stem until it stops turning, i.e., has forced the valve element fully against the valve seat. Too little motor power will not insure a fully closed valve and too much motor power may cause the valve element to mash hard against the valve seat causing increased wear or damage to the drive unit gears and other components. To avoid these situations, the prior art has established a practice of sizing the drive motor to stall at the maximum friction load needed to just close the valve. This means that the motor will just close the valve and remain in a stall condition to hold the valve shut. Such a practice not only wastes electrical power during extensive valve closure periods, but causes wear on the motor and drive gears in the form of vibration, called "chatter". Further, should a power failure occur during this valve-closure hiatus, the drive motor would cease its electrical stall and possibly allow the closed valve to drift open and allow fluid-flow through the valve when none is desired.

Also, there is the problem known as "stiction". This term comes about because of frictional buildup in the valve. While the valve stem is in motion, there is generally constant friction encountered and the load on the drive motor remains relatively uniform. That is to say, there is no buildup of forces in the valve itself and the movement from full-open to nearly full-closed position may be handled by the drive motor without difficulty. However, when the valve reaches the fully-closed position, a sudden increase in frictional load occurs in the valve stem because of tightness achieved between the valve parts as well as some friction buildup caused by flow interruption in the line. To open a fully-closed valve therefore requires the drive motor to initially overcome this rather large frictional force or "stiction". Once the valve is cracked open by the drive-motor, the stem friction drops to the relatively low value throughout the remainder of valve travel. With the prior art drive motor at stall, or maximum torque, to hold the valve closed, there is not any extra power during reverse operation to overcome this stiction and the valve often remains closed until movement is started by hand.

The prior art has attempted to utilize springs in conjunction with motorized valves to perform certain tasks, but none of these uses have dealt with the problems discussed above. In U.S. Pat. No. 4,203,573, a torsional assist spring is provided to store energy when the motor-driven valve element is rotated from its closed to its fully opened position and to release such stored energy when the valve energy is rotated from its open to its closed position to thereby assist the motor unit in driving the valve stem in the valve-closed direction. This is the opposite of what is now shown to be needed to overcome stiction created during the opening of the valve. U.S. Pat. No. 4,621,789 discloses a mechanism that is incorporated into a motorized valve in the form of a spring used to automatically open or close the valve when it becomes impossible to control the valve for energization due to power failures. This disclosure does not solve the problem of holding a valve closed while power is on.

SUMMARY OF THE INVENTION

This invention is a feedback motor-operated or motor-driven valve that overcomes all of the aforesaid problems presently existing in the prior art. For instance, this invention provides for the drive- motor to turn off after the valve is closed and yet hold the valve closed by positive force. This condition eliminates the continuous stall environment of the prior art and results in an immediate savings in electrical energy and in reduced wear and tear on the drive-motor, its components and the drive gears. Further, bias means is utilized in a unique manner that permits it to be loaded with energy during closure of the valve and discharge this energy into the valve-opening process to help overcome stiction. In addition, the invention permits the use of a very strong or high-torque drive-motor to operate the valve and use only a portion of its total torque to close the valve. The full torque of the motor is thereafter usable when the valve is turned in the opposite direction to open and thus stiction is over-come by the application of a far-larger amount of torque than was used to close the valve. In addition, the drive-motor begins opening the valve, while at full speed. This is to say, the motor must unwind the spring before hitting the closed valve to begin to open it. Accordingly, the motor is more efficient in its application in opening a closed valve.

The aforesaid benefits are achieved by providing a bias means between the gear means and the valve stem to absorb energy from the drive-motor after the valve element becomes closed against the valve seat and before the motor output shaft ceases turning, in combination with means to allow the drive-motor shaft to overturn the closed position of the valve before it shuts off or ceases turning, so that the bias means can absorb the energy expended in the overturning to ensure constant bias pressure on the closed valve element.

Accordingly, the main object of this invention is a feedback, motor-operated valve that turns off after the valve is closed and yet holds the valve closed by bias pressure. Other objects include a valve that does not waste electric power in holding a valve closed, a valve that eliminates intercomponent vibration or "chatter" during the time the valve is closed, a valve that provides extra energy during the valve-opening portion of the cycle to eliminate stiction; a valve that may use a larger drive-motor to overcome stiction and yet not damage the valve seat or valve components upon closure; and, a valve that is easily retrofittable into existing processes.

These and other objects of the invention will become more apparent upon reading the description of the Preferred Embodiment taken together with the drawings appended hereto. The scope of protection sought by the inventor may be gleaned from a fair reading of the claims that conclude this specification.

DESCRIPTION OF THE PREFERRED EMBODIMENT

Figure 1:
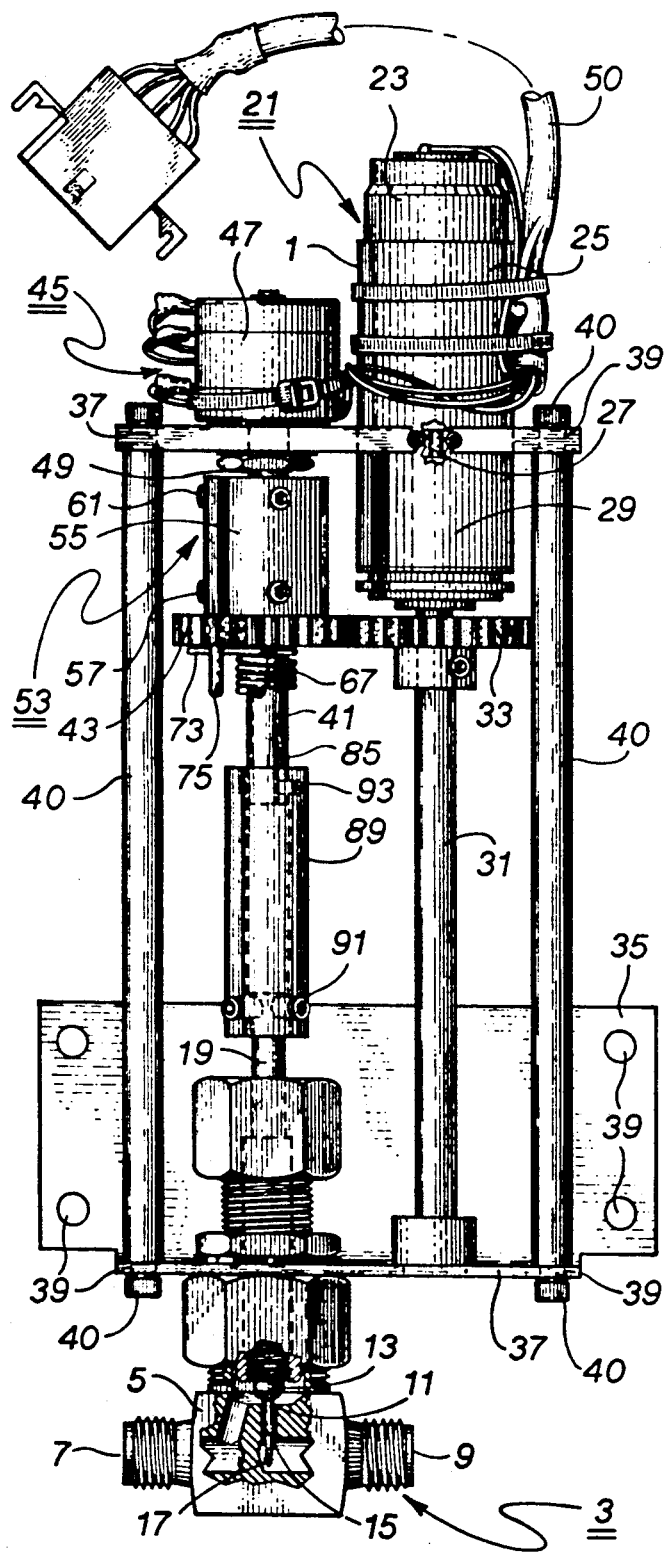
FIG. 1 is a side view of the preferred embodiment of this invention showing the components assembled and mounted on a frame adjacent a typical valve.

As shown in the drawings, wherein like elements are identified with like numerals throughout the five figures, FIG. 1 shows the preferred embodiment of the feedback, motor-operated valve assembly 1 of this invention to comprise a valve means 3, such as a needle valve, regulating valve or shutoff valve, that includes a casing 5 of brass or other hard, machinable substance with a valve inlet 7 and a valve outlet 9 separated by a valve seat 11 operably positioned therebetween. A valve element 13, usually in the form of a short stub 15, having a conical head 17 machined thereon is threadably positioned in casing 5 for screw-like movement into and out of sealing engagement with valve seat 11. A valve stem 19 extends from stub 15 outward from case 5 for actuation of the valve from fully-closed to fully-opened and to various positions therebetween. Packing (not shown) is usually placed about valve stem 19 to prevent leakage from valve means 3.

Reversible motor-driven valve actuation means 21 is provided to manipulate valve means 3 and includes a reversible electric drive-motor 23 including a motor housing and components 25 and a motor drive shaft 27 interconnected through a gear reduction transmission 29 to an output shaft 31 on which a drive gear 33 is concentrically mounted. Usually motor 23 turns at high speed, i.e., 10–12,000 rpm while output shaft 31 turns at a slow 20–40 rpm.

Figure 2:
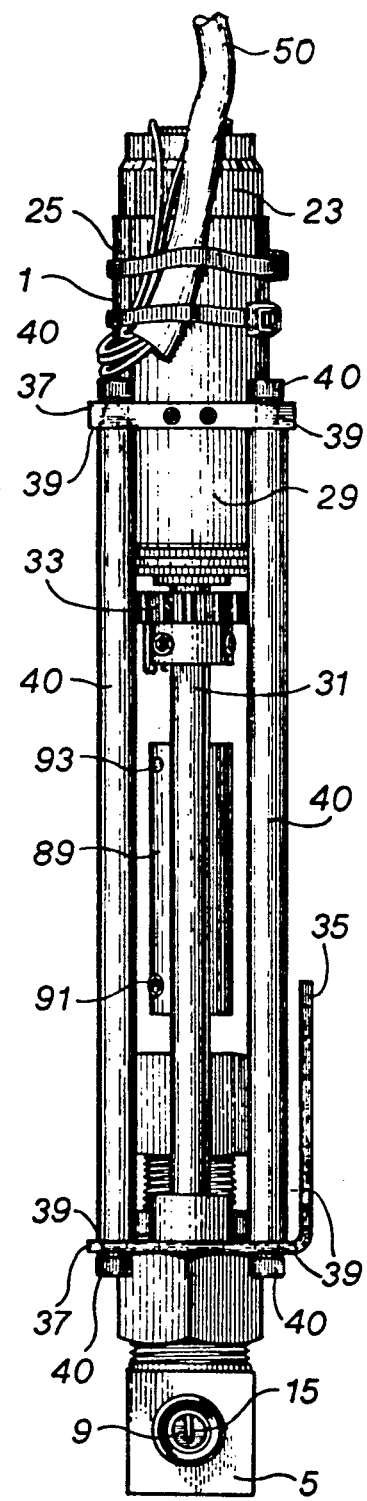
FIG. 2 is a side elevational view of the same embodiment shown in FIG. 1 showing part of the frame on which the invention is mounted.

A frame 35 is arranged about valve means 3 and motor-driven actuation means 21 for assembly of all the components. Frame 35, as shown in FIGS. 1 and 2, includes a plurality of spaced-apart mounting plates 37 that have formed therein mounting holes 39 as well as long bolts 40 to hold the frame together as shown in FIGS. 1 and 2. A driven shaft 41 is interposed parallel to motor drive shaft 31 (and axially with valve stem 19) and includes a driven gear 43, arranged in engagement with drive gear 33 as shown in FIG. 1. As arranged, and with drive gear 33 and driven gear 43 being of the same size and number of gear teeth, one turn of motor drive shaft 31 results in one turn of driven shaft 41, valve stem 19 and valve element 13. Usually, valves of the construction utilizing motor drives of the type shown here require numerous turns of the valve element between opened and closed positions and are substantially linear with respect to the turns per degree of opening of the valve.

An electro-mechanical feedback means 45 is provided and is operably connected to either motor drive shaft 31 or driven shaft 41, axially or through gearing. As shown in FIG. 1, means 45 is connected to driven gear 43 as will hereinafter be more fully explained. Means 45 is preferred to be a potentiometer in the form of a cylindrically-shaped resistance body 47 having a movable internal wiper (not shown) actuated by a turnable shaft 49 extending from said body. The total resistance may be on the order of, for example, 500 ohms, and taking, for example, ten turns of shaft 49 to proceed from 0 to 500 ohms. The potentiometer usually has three electric taps. Other types of electro-mechanical feedback devices are just as useful herein, such as variable inductors, mechanical-to-electrical transducers, and encoders, and all are fully contemplated for use herein within the scope and spirit of the invention.

An electric signal in the form of a certain amount of voltage is sent through a balancing amplifier unit (not shown) via cable 50 to two of the taps calling for the potentiometer to produce a certain voltage at the third tap. Should motor 23 not be in a position to provide the appropriate output signal or voltage, current will be applied to motor 23 to turn it one way or the other to cause potentiometer shaft 49 to move the slide to a position where the proper signal is outputted so that the amplifier will become balanced and motor 23 ordered to stop. In this manner, the input signal to feedback means 45 controls the direction and distance motor drive shaft 27 will move valve element 13 toward and away from valve seat 11.

Figure 3:
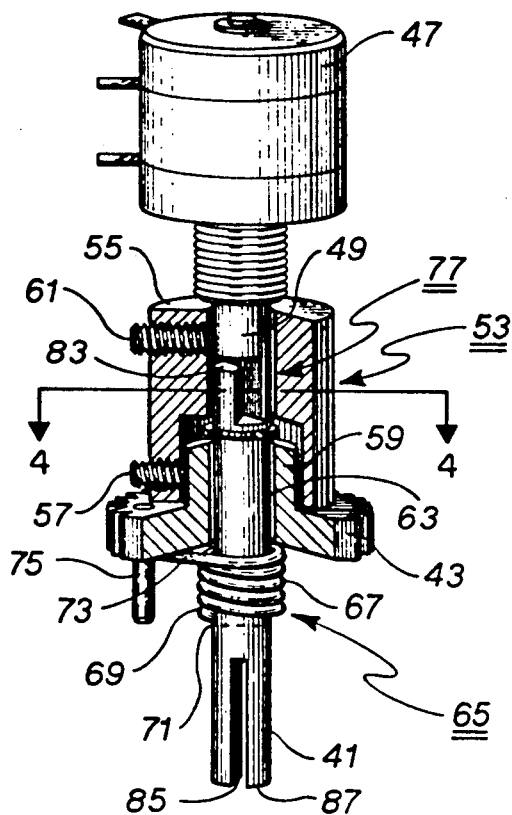
FIG. 3 is a side elevational view, partially in section, of the preferred embodiment of the zero-flow and anti-stiction device of this invention.

As shown in FIGS. 1 and 3, means 53 is provided to allow a controlled amount of overturning of motor drive shaft 27 following full closure of valve element 13 against valve seat 11. The preferred embodiment of means 53 is shown in sectional view in FIG. 3 to comprise a collar 55 or other mechanical means to rigidly interconnect drive gear 43 and potentiometer turnable shaft 49. As shown, one or more set screws 57 interconnect one end of collar 55 to a boss 59 protruding from one side of driven gear 43 and another series of set screws 61 interconnect the other end of collar 55 with potentiometer turnable shaft 49.

Driven shaft 41 is passed through the center bore 63 of driven gear 43 and is not directly connected to drive gear 43. Spring means 65, however, is provided to interconnect drive shaft 41 and driven gear 43. As shown in FIG. 3, bias means 65 includes a helical spring 67 wound about driven shaft 41 and having one portion or terminal end 69 affixed to shaft 41 by passing through a cross-bore 71 formed in shaft 41 and another portion 73 resting against a pin or stop 75 protruding from driven gear 43.

Figure 4:
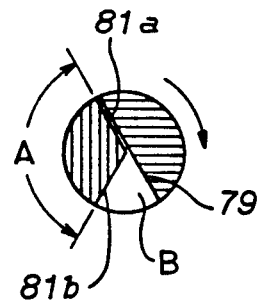
FIG. 4 is a sectional view of the juncture of the driven shaft and the shaft of the electro-mechanical feedback means showing the ability of the invention to overturn the closed valve stem; and, FIG. 5 is an exploded a trimetric view of the components making up another embodiment of the zero-flow and anti-stiction device of this invention.

Means 77 is provided for interconnecting driven shaft 41 to potentiometer turnable shaft 49 to permit a controlled amount of angular rotation therebetween. Means 77 is shown in FIG. 4 to comprise a first split shaft land 79 ground or otherwise formed at the end of potentiometer turnable shaft 49 and a pair of second split shaft lands 81a and 81b formed at one end 83 of driven shaft 41 and extending radially outward to form an acute angle "A" therebetween. Land 79 and lands 81a and 81b are then arranged in axial overlapped position as shown. Thus arranged, there is an open area "B" left between land 81b and land 79 through which driven gear 43 (and potentiometer shaft land 79) may rotate during the overturn caused by continued rotation of drive-motor 23 through driven shaft 31 and drive gear 33. Other forms of shaft overturn devices are contemplated herein.

A slot 85 is formed axially inward from the other end 87 of driven shaft 41. A second collar 89, having an axial bore 90 formed therethrough, is attached to valve stem 19 by set screws 91 and slipped over driven shaft end 87. A cross-pin 93 is mounted in second collar 89, to span bore 90, and arranged to ride in driven shaft slot 85. In this manner, the advancing or retracting of valve stem 19 into and out of valve casing 5 is taken up in collar 89 so that driven shaft 41 may remain positionally stationary and turn with both valve stem 19 and turnable shaft 49.

In operation, valve element 13 is closed against valve seat 11, then driven gear 43 is turned slightly to partially wind helical spring 67 about driven shaft 41 to "preload" the bias means. Shaft lands 79, 81a and 81b are arranged as shown in FIG. 4 and turn together as indicated by the arrow. Set screws 57 and 61 are then tightened against boss 59 and turnable shaft 49 respectively to lock bias means 65 in a partially loaded condition. When a signal is sent to feedback means 45 calling for motor 23 to drive valve element 13 off valve seat 11, i.e., to open valve means 3, spring means 65 remains preloaded.

When it is desired to close valve means 3, the signal sent to motor 23 is purposely set to require motor 23 to rotate valve stem 19 beyond the position where valve element 13 seats tightly against valve seat 11. When valve element 13 seats against valve seat 11, valve stem 19 and driven shaft 41 stop turning. At this point, however, feedback means 45 continues to call for motor 23 to turn drive shaft 41. Drive shaft 31 turns drive gear 33 against driven gear 43 causing driven gear 43 to turn about motionless driven shaft 41 and wind spring 67 tighter thereabout. During this "wind up" operation, potentiometer turnable shaft 49 is rotated by first collar 55 through angle "B" to a position where it feeds a signal back to the balance amplifier calling for motor 23 to stop turning.

In this condition, motor 23 is turned off so that no power is thereafter wasted. Also, the overturning of driven gear 43 has not only absorbed some of the torque energy expended in the overturning step but spring bias is placed directly as a rotational torque against valve element 13 continuously urging it to remain closed against valve seat 11. The gears in gear reduction transmission 29 are of a nature and arrangement that they do not allow the reverse torque from spring 67 to cause rotational motion in the opposite direction so as to allow the valve to "unwind" and open. This is especially true when using a planetary gear reduction transmission.

Figure 5:
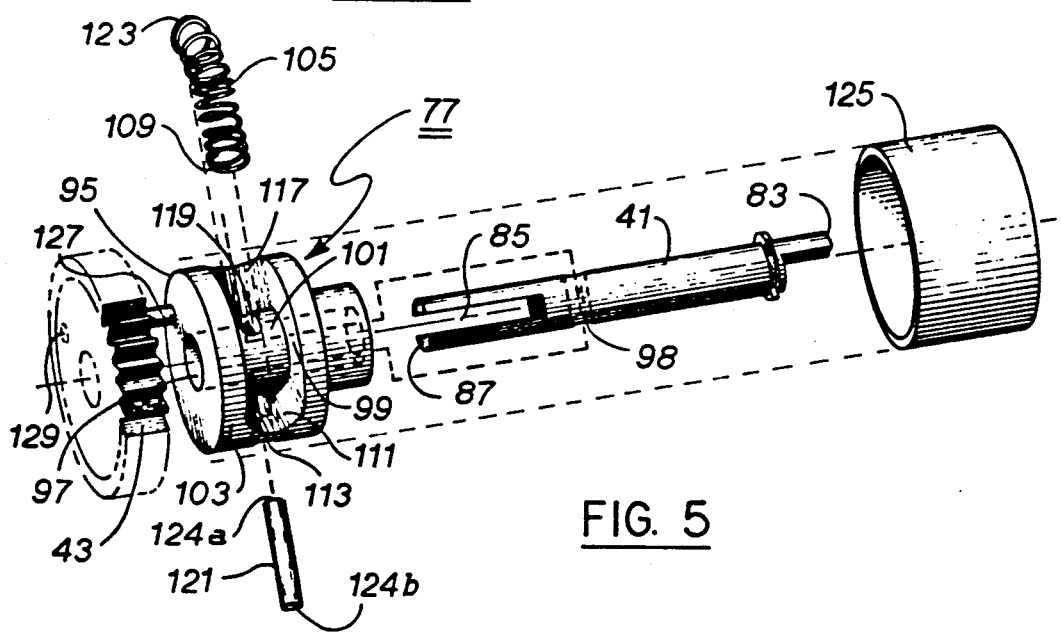

Another embodiment of means 77 is shown in FIG. 5. A wheel-shaped element 95 is provided having an elongated central bore 97 in which to receive driven shaft 41 in axial and pivotal (sliding) alignment. A slot 99 of terminal length is formed about a circumferential portion of element 95 downward to terminate at a circumferential floor 101 formed between bore 97 and the outer element surface 103. Bias means 65 is set in slot 99 in the form of a coiled spring 105 of terminal length that is curved to fit in said slot below the outer element surface 103. It is preferred to preload the spring by having slot 99 made shorter than said spring so that said spring needs to be slightly compressed or preloaded before placing in slot 99. Preferably, one terminal end 109 of spring 105 is arranged to rest against one end 111 of slot 99.

An elongated cross-bore 113 is formed through element 95 transverse to central bore 97 for alignment with a similar cross-bore 98 formed through driven shaft 41. One end of cross-bore 113 opens into slot 99 at the opposite end 117 thereof through an elongated or widened opening 119. A short, cross-pin 121 is received in driven shaft cross-bore 115 and extends through elongated opening 119 in between the other terminal end 123 of spring 105 and the end of slot 99. Cross-pin 121 is inserted in cross-bore 113 and pushed further into said crossbore until its one terminal end 124a becomes flush with the entrance into bore 98 and the other end 124b protrudes out through slot 119 in between slot end 117 and spring end 123. A collar 125 is slipped over outer element surface 103 and clamped or otherwise made tight thereto by known means such as peening the edges around the edges of surface 103 or by shrink fitting.

Driven gear 43 is attached to the front end of element 95 by a pin 127 received in aperture 129 and is placed in contact with drive gear 33 as shown in FIG. 1. Collar 55 attaches element 95 to feedback potentiometer 47 similarly as shown in FIG. 3. Slot 99 may be formed tangentially in element 95 as well as circumferentially as shown.

In operation of this embodiment, after valve element 13 closes against valve seat 11, valve stem 19 and driven shaft 41 stop turning. Feedback means 45 again calls for motor 23 to continue to turn. Drive gear 33 then turns driven gear 43 about stopped driven shaft 41 forcing cross-pin 121 to begin compressing coil spring 105 in slot 99. When feedback means 45 stops motor 23, the energy in compressed coil spring 105 acts as a bias rotational torque holding valve element 13 closed against valve seat 11.

Not only is this bias urged against the closed valve but, upon reverse rotation of drive-motor 23, the energy stored in compressed spring 105 is added to the torque of motor 23 to overcome stiction in opening valve means 3. In addition, a more powerful motor than the stall-type motors of the prior art may be used as the motor is shutoff after closing the valve. Upon reversal of the motor, this added power may also be applied to overcome stiction in opening the valve. Further, as shown in FIG. 4, the overturning may be varied in degrees depending upon the angle A between lands 81a and 81b. This overturning can be as little as a few degrees (angle A a few degrees less than 180°) to slightly less than 180° (angle A equals a few degrees less than 180°). It is preferred, however, that angle A be approximately 150° so that the overturn is only continued about 30°. This overturn also allows motor 23 to reach its full rpm before driven shaft 41 and valve stem 23 begin to open the valve.

In another embodiment of this invention, valve element 13, valve stem 19, motor-driven actuation means 21, electro-mechanical feedback means 45, and controlled overturn means 53 are axially aligned on one shaft. In this embodiment, means 45 merely has turnable shaft 49 passing completely through body 47 to allow all the parts to turn together. Driven shaft 41 would lie between drive shaft 31 and valve stem 19.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. A feedback, motor-operated valve, comprising:
   a) valve means including a casing having an inlet, an outlet and a valve seat operably positioned therebetween, and further including a valve element movably mounted in said casing to control flow between said inlet and said outlet, said valve element adapted for screw-like movement into and out of sealing engagement with said valve seat by a valve stem rotatably mounted in said valve casing and extending through said casing exterior thereof;
   b) reversible motor-driven actuating means for said valve means including a reversible drive motor having an output shaft and drive gear which can be driven together in both a clockwise and counterclockwise direction for turning said valve element;
   c) a driven shaft interposed said motor drive shaft and said valve stem and connected to said valve stem, including a driven gear for engagement with said drive gear to effect turning of said valve element from turning said motor drive shaft;
   d) electro-mechanical feedback means operably connected to said driven shaft for providing an electric signal output in response to the position of said valve element with respect to said valve seat; and,
   e) means freely rotatable with said driven shaft for providing a controlled amount of overturning of said motor drive shaft following full closure of said valve element against said valve seat and simultaneously storing a portion of the drive energy expended in said overturning, to bias said valve in its closed position, and to discharge said stored energy to aid in opening said valve upon reverse turning of said drive motor and motor drive shaft.

2. The feedback, motor-operated valve of claim 1 wherein said valve means is a needle valve.

3. The feedback, motor-operated valve of claim 1 wherein said valve is a regulating valve.

4. The feedback, motor-operated valve of claim 1 wherein said valve means is a shutoff valve.

5. The feedback, motor-operated valve of claim 1 further including means for reducing the high rotational speed of said motor to a slower rotational speed of said output shaft.

6. The feedback, motor-operated valve of claim 5 wherein said means is a gear reduction transmission.

7. The feedback, motor-operated valve of claim 1 wherein said valve stem and said driven shaft are in axial alignment and spaced-apart from said drive shaft and arranged parallel thereto.

8. The feedback, motor-operated valve of claim 1 wherein said electro-mechanical feedback means includes a feedback potentiometer of the type wherein a rotatable shaft is turned to change the output signal.

9. The feedback, motor-operated valve of claim 1 wherein said electro-mechanical feedback means includes an encoder.

The feedback, motor-operated valve of claim 1 wherein

10. The feedback, motor-operated valve of claim 1 wherein said electro-mechanical feedback means includes a variable inductor.

11. The feedback, motor-operated valve of claim 1 wherein said electro-mechanical feedback means includes a mechanical-to-electrical transducer.

12. The feedback, motor-operated valve of claim 1 wherein said means for providing a controlled amount of overturning includes:
   a) means for rigidly interconnecting said driven gear and said electro-mechanical feedback means;
   b) bias means interconnected said driven shaft and said driven gear;
   c) means for interconnecting said driven shaft and said electro-mechanical feedback means to permit a controlled amount of angular rotation therebetween; and,
   d) electric signal means inputted to said drive motor to cause it to rotate said drive shaft and drive said driven shaft to move said valve element into closed, sealing contact with said valve seat and then continue to rotate said driven gear against said bias means a controlled amount of angular overrotation and compress said bias means until said signal from said electro-mechanical feedback means causes said drive motor to shut down and cease turning to place said valve-closing torsional bias against said closed valve element.

13. The feedback motor-operated valve of claim 12 wherein said electro-mechanical feedback means includes a turnable shaft extending therefrom to change the output signal as a function of shaft rotation and said means for rigidly interconnecting said driven gear and said electro-mechanical feedback means includes a collar attached between said turnable shaft and said driven gear.

14. The feedback motor-operated valve of claim 12 wherein said bias means includes a helical spring wound about said driven shaft having one portion fixed to said shaft and another portion in fixable contact with said driven gear, said spring arranged to be wound tighter by said drive motor as said driven gear overturns said driven shaft that has stopped turning after said valve reaches its closed position.

15. The feedback motor-operated valve of claim 12 wherein said bias means is preloaded with torsional bias.

16. The feedback motor-operated valve of claim 12 wherein said electro-mechanical feedback means includes a turnable shaft extending therefrom to change the output signal as a function of shaft rotation, wherein said means for rigidly interconnecting said driven gear and said electro-mechanical feedback means includes a collar attached between said turnable shaft and said driven gear, wherein said spring means includes a helical spring wound about said driven shaft having one portion fixed to said shaft and another portion in fixable contact with said driven gear, said spring arranged to be wound tighter by said drive motor as said driven gear overturns said driven shaft that has stopped turning after said valve reaches its closed position, and wherein said spring is preloaded with torsional bias by rotating said driven gear about said driven shaft before fixing said driven gear and said electro-mechanical feedback means in rigid interconnection.

17. The feedback motor-operated valve of claim 12 wherein said means for interconnecting said driven shaft and said electro-mechanical feedback means to permit a controlled amount of angular rotation therebetween includes:
   a) a turnable shaft extending therefrom to change the output signal as a function of shaft rotation;
   b) a first split shaft land formed on said shaft;
   c) a pair of second split shaft lands formed on said driven shaft and extending outward to form an angle therebetween;
   d) said first and second split shaft lands arranged in overlapped axial alignment to allow a controlled amount of angular rotation therebetween.

18. The feedback motor-operated valve of claim 12 wherein said bias means includes:
   a) a first element having an elongated, central bore formed therethrough for sliding and pivotal receipt therein of said driven shaft;
   b) a slot of terminal length formed about a portion of said element and extending downward toward a floor formed in said element between said central bore and the outer surface of said element;
   c) a coiled spring for receipt in said slot having one end thereof arranged to bear against one end of said slot;
   d) an elongated cross-bore formed in said element transverse to said central bore and opening into said slot through an elongated opening, said cross-bore arranged to align with a cross-bore formed in said driven shaft; and,
   e) a cross-pin received in said cross-bore and extending into said elongated cross-bore in contact with the other end of said spring through said elongated opening and arranged to bear against said spring and compress it as said element is overturned by said drive motor against a controlled amount of angular rotation until a signal from said electro-mechanical feedback means causes said drive motor to cease turning to place a valve-closing torsional bias against said closed valve element.

19. The feedback motor-operated valve of claim 18 wherein said slot is formed tangential about a portion of said element.

20. The feedback motor-operated valve of claim 18 wherein said slot is formed circumferentially about a portion of said element.

21. In a feedback, motor-operated valve, comprising valve means including a casing having an inlet, an outlet and a valve seat operably positioned therebetween, and further including a valve element movably mounted in said casing to control flow between said inlet and said outlet, said valve element adapted for screw-like movement into and out of sealing engagement with said valve seat by a valve stem rotatably mounted in said valve casing and extending through said casing exterior thereof, a reversible motor-driven actuating means for said valve means including a reversible drive motor having an output shaft and drive gear which can be driven together in both a clockwise and counterclockwise direction for turning said valve element, a driven shaft interposed said motor drive shaft and said valve stem and connected to said valve stem, including a driven gear for engagement with said drive gear to effect turning of said valve element from turning said motor drive shaft, and, electro-mechanical feedback means operably connected to said driven shaft for providing an electric signal output in response to the position of said valve element with respect to said valve seat, the improvement comprising means freely rotatable with said driven shaft for providing a controlled amount of overturning of said motor drive shaft following full closure of said valve element against said valve seat and simultaneously storing a portion of the drive energy expended in said overturning, to bias said valve into its closed position, and to discharge said stored energy to aid in opening said valve upon reverse turning of said drive motor and motor drive shaft.

22. The improvement of claim 21 wherein said means for providing a controlled amount of overturning of said motor drive shaft following full closure of said valve element against said valve seat and simultaneously storing a portion of the drive energy expended in said overturning, to bias said valve into its closed position, and to discharge said stored energy to aid in opening said valve upon reverse turning of said drive motor and motor drive shaft, comprises:
   a) means for rigidly interconnecting said driven gear and said electro-mechanical feedback means;
   b) bias means interconnected said driven shaft and said driven gear;
   c) means for interconnecting said driven shaft and said electro-mechanical feedback means to permit a controlled amount of angular rotation therebetween; and,
   d) electric signal means inputted to said drive motor to cause it to rotate said drive shaft and drive said driven shaft to move said valve element into closed, sealing contact with said valve seat and then continue to rotate said driven gear against said spring means a controlled amount of angular rotation until said signal from said electro-mechanical feedback means causes said drive motor to shut down and cease turning to place a valve-closing torsional bias against said closed valve element.

23. The improvement of claim 22 wherein said bias means interconnected said driven shaft and said driven gear includes a helical spring wound about said driven shaft having one portion fixed to said shaft and another portion in fixable contact with said driven gear, said spring arranged to be wound tighter by said drive motor as said driven gear overturns said driven shaft that has stopped turning after said valve reaches its closed position.

24. The improvement of claim 22 wherein said bias means interconnected said driven shaft and said driven gear includes:
   a) a first element having an elongated central bore formed therethrough for sliding and pivotal receipt therein of said driven shaft;

b) a slot of terminal length formed about a portion of said element and extending downward toward a floor formed in said element between said central bore and the outer surface of said element;

c) a coiled spring for receipt in said slot having one end thereof arranged to bear against one end of said slot;

d) an elongated cross-bore formed in said element transverse to said central bore and opening into said slot through an elongated opening, said cross-bore arranged to align with a cross-bore formed in said driven shaft; and, e) a cross-pin received in said cross-bore and extending into said elongated cross-bore in contact with the other end of said spring through said elongated opening and arranged to bear against said spring and compress it as said element is overturned by said drive motor against a controlled amount of angular rotation until a signal from said electro-mechanical feedback means causes said drive motor to cease turning to place a valve-closing torsional bias against said closed valve element.

25. A feedback, motor-operated valve, comprising:

a) valve means including a casing having an inlet, an outlet and a valve seat operably positioned therebetween, and further including a valve element movably mounted in said casing to control flow between said inlet and said outlet, said valve element adapted for screw-like movement into and out of sealing engagement with said valve seat by a valve stem rotatably mounted in said valve casing and extending through said casing exterior thereof;

b) reversible motor-driven actuating means for said valve means including a reversible drive motor having an output shaft that can be driven together in both a clockwise and counterclockwise direction for turning said valve element;

c) a driven shaft interposed said motor drive shaft and said valve stem and connected to said valve stem, to effect turning of said valve element from turning said motor drive shaft;

d) electro-mechanical feedback means operably connected to said driven shaft for providing an electric signal output in response to the position of said valve element with respect to said valve seat; and, e) means for providing a controlled amount of overturning of said motor drive shaft following full closure of said valve element against said valve seat and simultaneously storing a portion of the drive energy expended in said overturning, to bias said valve in its closed position, and to discharge said stored energy to aid in opening said valve upon reverse turning of said drive motor and motor drive shaft.

* * * * *